(12) United States Patent
Igashira et al.

(10) Patent No.: US 6,840,466 B2
(45) Date of Patent: Jan. 11, 2005

(54) HYDRAULIC CONTROL VALVE AND FUEL INJECTOR USING SAME

(75) Inventors: Toshihiko Igashira, Toyokawa (JP); Satoshi Hayashi, Kuwana (JP)

(73) Assignee: Denso Corporation (JP)

( * ) Notice: Subject to any disclaimer, the term of this patent is extended or adjusted under 35 U.S.C. 154(b) by 316 days.

(21) Appl. No.: 10/026,431

(22) Filed: Dec. 27, 2001

(65) Prior Publication Data

US 2002/0117560 A1 Aug. 29, 2002

(30) Foreign Application Priority Data

Dec. 28, 2000 (JP) .................................. 2000-400262
Dec. 28, 2000 (JP) .................................. 2000-400270
Sep. 10, 2001 (JP) .................................. 2001-272970

(51) Int. Cl.$^7$ .................................................. B05B 1/30
(52) U.S. Cl. ..................... 239/585.1; 239/88; 239/90; 239/91; 239/92; 239/95; 239/102.1; 239/102.2; 239/124; 239/585.5
(58) Field of Search ............................ 239/88, 90, 91, 239/92, 95, 102.1, 102.2, 124, 585.1, 585.2, 585.3, 585.4, 585.5

(56) References Cited

U.S. PATENT DOCUMENTS

| 5,779,149 | A | | 7/1998 | Hayes, Jr. |
| 5,975,428 | A | * | 11/1999 | Potschin et al. ............... 239/88 |
| 6,155,532 | A | | 12/2000 | Heinz et al. |
| 6,168,096 | B1 | * | 1/2001 | Potschin et al. ......... 239/533.3 |
| 6,367,453 | B1 | * | 4/2002 | Igashira et al. ............... 239/96 |
| 6,457,699 | B1 | | 10/2002 | Stoecklein |
| 6,547,213 | B1 | * | 4/2003 | Heinz et al. ............. 239/102.1 |
| 6,679,440 | B2 | * | 1/2004 | Igashira et al. .......... 239/585.5 |
| 2002/0139946 | A1 | | 10/2002 | Stocklein et al. |

FOREIGN PATENT DOCUMENTS

| DE | 44 06 522 C1 | 7/1995 |
| DE | 199 58 872 A1 | 6/2000 |
| JP | 11-166653 | 6/1999 |

* cited by examiner

Primary Examiner—Robin O. Evans
(74) Attorney, Agent, or Firm—Nixon & Vanderhye PC (57) ABSTRACT

A hydraulic control valve for a fuel injector for an automotive engine, which includes a piezoelectric actuator and a hydraulic valve mechanism. The hydraulic valve mechanism converts a mechanical deformation of the piezoelectric actuator produced as a result of application of a voltage into a hydraulic pressure to move a valve member for opening and closing a fluid port. The hydraulic valve mechanism is so designed that the piezoelectric actuator produces a maximum output force which works to develop the hydraulic pressure when opening the fluid port through the valve member and decreases after the fluid port is opened and which is set smaller than one-half of a maximum possible output force of the piezoelectric actuator under application of a maximum working voltage to said piezoelectric actuator, thereby ensuring a maximum movement of the valve member at high energy efficiency under application of the voltage within a working voltage range.

17 Claims, 4 Drawing Sheets

HYDRAULIC CONTROL VALVE AND FUEL INJECTOR USING SAME

BACKGROUND OF THE INVENTION

1. Technical Field of the Invention

The present invention relates generally to a hydraulic control valve equipped with a piezoelectric valve actuator and a fuel injector using the same.

2. Background Art

Typical common rail fuel injection systems for diesel engines of automotive vehicles have a common rail in which the high-pressure fuel supplied from a high-pressure pump is stored and inject the high-pressure fuel into each cylinder of the engine through a fuel injector. In recent years, as such fuel injectors, hydraulic control valves equipped with a quick response piezoelectric valve actuator are proposed which include a large-diameter piston moved by the expansion and contraction of the piezoelectric valve actuator, a displacement amplifying chamber filled with hydraulic fluid, and a small-diameter piston which are arranged in alignment with each other. The movement of the large-diameter piston causes the hydraulic fluid in the pressure chamber to change in pressure, which moves the small-diameter piston, thereby actuating a control valve. Specifically, the displacement amplifying chamber works to hydraulically amplify the expansion or displacement of the piezoelectric valve actuator using hydraulic leverage and transmit it to the small-diameter piston. The amplification factor is expressed by a ratio (S/s) of a pressure-energized area (S $mm^2$) of the large-diameter piston (i.e., an area of an end of the large-diameter piston on which the hydraulic pressure acts) to a pressure-energized area (s $mm^2$) of the small-diameter piston.

The control valve is designed to selectively close one of a low-pressure port leading to a drain passage and a high-pressure port leading to the common rail to control the pressure within a control chamber providing a back pressure to a nozzle needle of the fuel injector. Specifically, when the control valve opens the low-pressure port to establish fluid communication between the control chamber and the drain passage and closes the high-pressure port, it will cause the pressure in the control chamber to drop to lift the nozzle needle upward, thereby spraying the fuel from a spray hole. When it is required to terminate the fuel injection, the control valve opens the high-pressure port to establish fluid communication between the control chamber and the common rail while it closes the low-pressure port, it will cause the pressure in the control chamber to rise to move the nozzle needle downward, thereby closing the spray hole.

Figure 4A:
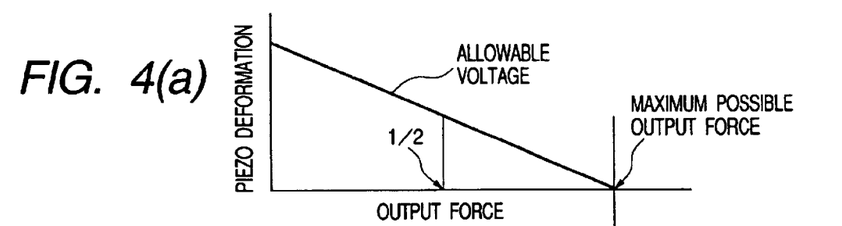
FIG. 4(a) shows a relation between an output force and a displacement of a piezo stack of a piezoelectric actuator when a maximum allowable voltage applied to the piezoelectric actuator is constant.
Figure 4B:
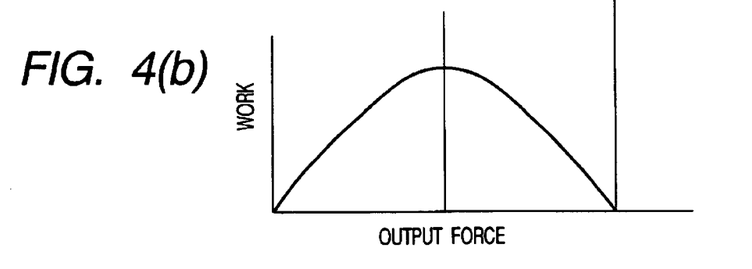
FIG. 4(b) shows a typical relation between a maximum work and an output force of a piezoelectric device when subjected to a 3 maximum load.

Typical piezoelectric devices used as actuators have a displacement-to-output force relation, as shown in FIG. 4(a), when an applied voltage is constant (a maximum allowable voltage). The maximum allowable voltage is a recommended maximum voltage or working voltage (e.g., 150V) which can be applied in safety to the piezoelectric device without danger of breakdown of the piezoelectric device or an electric driver therefor. If the applied voltage is constant, a mechanical distortion or displacement of the piezoelectric device is produced in inverse proportion to the output force thereof. When the displacement of the piezoelectric device is suppressed completely, the piezoelectric device produces a maximum output force. A work of the piezoelectric device is proportional to an applied electric energy and has a given correlation to the output force. The relation between a maximum work and output force of the piezoelectric device when subjected to a maximum load is shown in FIG. 4(b). In general, it is known that an actuator implemented by a piezoelectric device is preferably all designed in terms of energy efficiency so that the output force of the actuator produced when undergoing a maximum required load may be one-half of a maximum possible output force thereof (i.e., an output force produced when the deformation of the actuator is restricted to zero), thereby allowing a maximum work to be obtained under application of a constant electric energy to the actuator.

Designing a fuel injector to have the above structure using the hydraulic leverage, we have encountered the following drawback. The fuel injector experiences a maximum required load when the control valve opens the low-pressure port. The output force F of a piezoelectric actuator required to open the low-pressure port is expressed by $F=S_L \cdot P \cdot (S/s)$ where $S_L$ is an area ($mm^2$) of a plane defined by an annular line that is a line of contact between the control valve and a valve seat around the low-pressure port (which will be referred to as a seat area below), P is the pressure ($Kg/mm^2$) of fuel within the common rail, and S/s is the amplification factor. The amplification factor was so determined that the output force F might be one-half of a maximum output force, but the amount of lift of the control valve did not reach a target value expected from FIGS. 4(a) and 4(b). The same problems was posed in a case where the output force required to close the high-pressure port (usually lower than the output force required to open the low-pressure port) was determined like the above.

Analyzing the above problem, we have found that the factor that the amount of lift of the control valve did not reach the expected target value is the structure of the fuel injector itself. Specifically, when an electric energy is applied to the piezoelectric actuator, it will cause the hydraulic pressure in the displacement amplifying chamber to rise through the large-diameter piston. When the hydraulic pressure within the displacement amplifying chamber acting on the small-diameter piston exceeds the pressure of fuel exerted from the high-pressure port on the control valve, it initiates a lift of the control valve to open the low-pressure port. At this time, the electric energy applied to the piezoelectric actuator is so controlled as to bring the voltage developed across terminals of a piezoelectric element of the piezoelectric actuator (will also be referred to as a piezo voltage below) into agreement with the above maximum allowable voltage. However, electric charges proportional to the output force are produced in the piezoelectric element when the control valve is lifted up, so that the energy applied to the piezoelectric actuator is decreased by an amount of energy of the charges. Therefore, when the output force of the piezoelectric actuator is decreased by a drop in hydraulic pressure within the control chamber caused by the lift of the control valve, the charges disappear from the piezoelectric element, so that the piezo voltage drops. This voltage drop has been found to be the factor that the amount of lift of the control valve does not reach the expected target value.

SUMMARY OF THE INVENTION

It is therefore a principal object of the invention to avoid the disadvantages of the prior art.

It is another object of the invention to provide an improved structure of a hydraulic control valve designed to secure required valve movement and a fuel injector using the same.

According to one aspect of the invention, there is provided an improved structure of a hydraulic control valve which is designed to ensure a desired movement of a valve member. The hydraulic control valve comprises a piezoelectric actuator working to be deformed under application of a voltage and a hydraulic valve mechanism working to convert deformation of the piezoelectric actuator into a hydraulic pressure to move the valve member hydraulically for opening and closing a fluid port selectively. The hydraulic valve mechanism is so designed that the piezoelectric actuator produces a maximum output force working to develop the hydraulic pressure when opening the fluid port through the valve member. The maximum output force decreases after the fluid port is opened and is set smaller than one-half of a maximum possible output force of the piezoelectric actuator under application of a maximum working voltage to the piezoelectric actuator, thereby ensuring a maximum movement of the valve member under application of the voltage within a working voltage range.

In the preferred mode of the invention, the hydraulic valve mechanism includes a large-diameter piston and a small-diameter piston. The large-diameter piston works to convert the deformation of the piezoelectric actuator into the hydraulic pressure. The hydraulic pressure acts on the small-diameter piston to move the valve member for opening the fluid port. The hydraulic pressure is amplified as a function of a diameter ratio of the large-diameter piston to the small-diameter piston. The diameter ratio is so determined that the maximum output force of the piezoelectric actuator when opening the fluid port is set smaller than one-half of the maximum possible output force thereof.

The maximum output force acts on the hydraulic pressure when opening the fluid port through the valve member is set greater than or equal to one-fourth of the maximum possible output force of the piezoelectric actuator.

According to the second aspect of the invention, there is provided a fuel injector which may be employed in an automotive internal combustion engine. The fuel injector includes a fuel spray mechanism working to spray fuel and a hydraulic control valve. The hydraulic control valve consists of a piezoelectric actuator and a hydraulic valve mechanism working to actuate the fuel spray mechanism. The piezoelectric actuator works to be deformed in response to application of a voltage. The hydraulic valve mechanism works to convert deformation of the piezoelectric actuator into a hydraulic pressure to move a valve member hydraulically for opening and closing a fluid port selectively, thereby controlling a second hydraulic pressure serving to actuate the fuel spray mechanism. The hydraulic valve mechanism is so designed that the piezoelectric actuator produces a maximum output force working to develop the hydraulic pressure when opening the fluid port through the valve member. The maximum output force decreases after the fluid port is opened and is set smaller than one-half of a maximum possible output force of the piezoelectric actuator under application of a maximum working voltage to the piezoelectric actuator.

The fuel spray mechanism includes a hydraulic control chamber in which a hydraulic pressure is developed and controlled by opening and closing the fluid port selectively through the valve member of the hydraulic valve mechanism to establish and block fluid communication between the hydraulic control chamber and a low-pressure passage, respectively. The hydraulic pressure in the hydraulic control chamber works to move a nozzle needle to open or close a spray hole for initiating or terminating fuel injection.

The hydraulic valve mechanism includes a hydraulic chamber in which the deformation of the piezoelectric actuator is converted into the hydraulic pressure and changed in level as a function of the deformation of the piezoelectric actuator. The hydraulic pressure in the hydraulic chamber of the hydraulic valve mechanism works to move the valve member to open the fluid port, thereby establishing the fluid communication between the hydraulic control chamber and the low-pressure passage to decrease the hydraulic pressure in the hydraulic control chamber for initiating the fuel injection.

The maximum output force acting on the hydraulic pressure when opening the fluid port through the valve member is set greater than or equal to one-fourth of the maximum possible output force of the piezoelectric actuator.

According to the third aspect of the invention, there is provided a hydraulic control valve which is designed to ensure a desired movement of a valve member. The hydraulic control valve comprises a piezoelectric actuator working to be deformed under application of an electric energy and a hydraulic valve mechanism working to convert deformation of the piezoelectric actuator into a hydraulic pressure and to change the hydraulic pressure as a function of the deformation of the piezoelectric actuator to move a valve member for closing either of a high-pressure port leading to a high-pressure passage and a low-pressure port leading to a low-pressure passage. When the electric energy is applied to the piezoelectric actuator, the hydraulic valve mechanism works to open the low-pressure port through the valve member while closing the high-pressure port. Alternatively, when the electric energy is released from the piezoelectric actuator, the hydraulic valve mechanism works to open the high-pressure port while closing the low-pressure port. The hydraulic valve mechanism is so designed that the electric energy to be applied to the piezoelectric actuator when opening the low-pressure port is greater than or equal to an electric energy required to close the high-pressure port, thereby ensuring movement of the valve member to establish a firm engagement of the valve member with the high-pressure port. The piezoelectric actuator may be replaced with a magnetostrictive actuator which works to shrink or expand when placed in a magnetic field.

In the preferred mode of the invention, the hydraulic valve mechanism includes a hydraulic chamber in which the deformation of the piezoelectric actuator is converted into the hydraulic pressure of a working fluid and changed in level as a function of the deformation of the piezoelectric actuator and a piston on which the hydraulic pressure acts to move the valve member so that the valve member rests on one of a low-pressure port seat formed around the low-pressure port and a high-pressure port seat formed around the high-pressure port. The hydraulic valve mechanism is so designed as to meet a relation below $$S_H \cdot P \cdot L + \tfrac{1}{2} \cdot (S_H \cdot P/s)^2 \cdot V/\gamma \leq \tfrac{1}{2} \cdot (S_L \cdot P/s)^2 \cdot V/\gamma$$

where $S_L$ is an area (mm$^2$) of the low-pressure port seat, $S_H$ is an area (mm$^2$) of the high-pressure port seat, V is a volume (mm$^3$) of the hydraulic chamber, r is a bulk modulus (Kg/mm$^2$) of the working fluid in the hydraulic chamber, s is an area (mm$^2$) of the piston on which the hydraulic pressure acts, L is a distance (mm) the valve member travels from the low-pressure port to the high-pressure port, and P is a pressure (Kg/mm$^2$) in the high-pressure passage.

According to the fourth aspect of the invention, there is provided a fuel injector which may be employed in automotive internal combustion engines. The fuel injector includes a fuel spray mechanism working to spray fuel and a hydraulic control valve. The hydraulic control valve consists of a piezoelectric actuator and a hydraulic valve mechanism working to actuate the fuel spray mechanism. The piezoelectric actuator works to be deformed under application of an electric energy. The hydraulic valve mechanism works to convert deformation of the piezoelectric actuator into a hydraulic pressure and to change the hydraulic pressure as a function of the deformation of the piezoelectric actuator to move a valve member for closing either of a high-pressure port leading to a high-pressure passage and a low-pressure port leading to a low-pressure passage to control a second hydraulic pressure serving to actuate the fuel spray mechanism. When the electric energy is applied to the piezoelectric actuator, the hydraulic valve mechanism works to open the low-pressure port through the valve member while closing the high-pressure port. When the electric energy is released from the piezoelectric actuator, the hydraulic valve mechanism works to open the high-pressure port while closing the low-pressure port. The hydraulic valve mechanism is so designed that the electric energy to be applied to the piezoelectric actuator when opening the low-pressure port is greater than or equal to an electric energy required to close the high-pressure port. The piezoelectric actuator may be replaced with a magnetostrictive actuator which works to shrink or expand when placed in a magnetic field.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
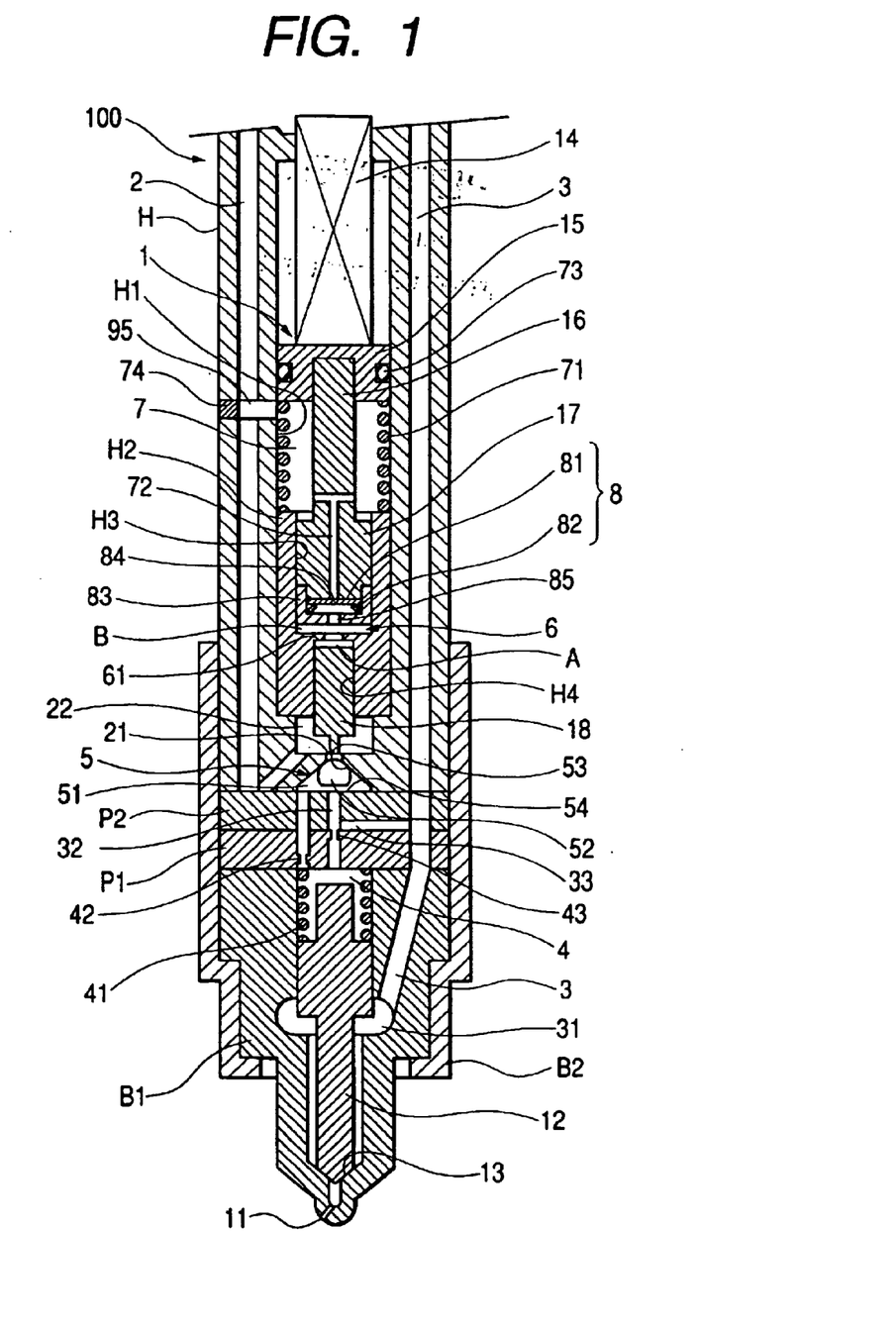
FIG. 1 is a vertical sectional view which shows a fuel injector equipped with a piezoelectric actuator according to the first embodiment of the invention.

Referring to the drawings, wherein like reference numbers refer to like parts in several views, particularly to FIG. 1, there is shown a fuel injector 100 according to the invention. The following discussion will refer to, as an example, a common rail fuel injection system in which the fuel injector 100 is provided for each cylinder of a diesel engine. The common rail fuel injection system includes a common rail which accumulates therein fuel supplied from a fuel tank elevated in pressure by a fuel pump installed on the engine. When it is required to inject the fuel into the engine, the fuel stored in the common rail is supplied to the fuel injectors 100 under high pressure.

The fuel injector 100 is designed to move a nozzle needle 12 vertically to open or close a spray hole 11 formed in a head of a nozzle body B1 for initiating or terminating fuel injection. The nozzle body B1 may alternatively have a plurality of spray holes formed in the head thereof. The spray hole 11 is opened upon movement of the nozzle needle 12 to an upper limit position and communicates with a fuel sump 31 leading to a high-pressure passage 3, so that the fuel is supplied to the spray hole 11. The spray hole 11 is closed upon movement of the nozzle needle 12 to a lower limit position, so that the communication with the fuel sump 31 is blocked to cut the fuel supply to the spray hole 11. The low limit position of the nozzle needle 12 is defined by a nozzle seat 13 on which the nozzle needle 12 is seated. The upper limit position is defined by an orifice plate P1 disposed above the nozzle body B1.

The nozzle body B1 is installed on a lower end of a housing H of a hydraulic control valve 1 through orifice plates P1 and P2 and disposed within a nozzle holder B2 in liquid-tight form. The high-pressure passage 3 extends upward from the fuel sump 31 to the common rail through the orifice plates P1 and P2 and the housing H. Within the housing H, a drain passage 2 is formed which leads to the fuel tank. A control chamber 4 is defined between an upper end of the nozzle needle 12 and the orifice plate P1. The nozzle needle 12 is urged downward, as viewed in the drawing, by the spring pressure of a coil spring 41 and the hydraulic pressure within the control chamber 4 to close the spray hole 11 at all times.

The hydraulic pressure in the control chamber 4 is controlled by the activity of a three-way valve 5 installed in the hydraulic control valve 1. The three-way valve 5 consists of a conical valve chamber 51 formed in a lower end of the housing H and a ball valve 52. The valve chamber 51 always communicates with the control chamber 4 through a passage extending through the orifice plates P1 and P2 and a main orifice 42 formed in the passage. The valve chamber 51 has two ports: a drain port 21 and a high-pressure port 32. The ball valve 52 closes either the drain port 21 or the high-pressure port 32 at all times, thereby establishing fluid communication between one of the drain port 21 and the high-pressure port 32 and the control chamber 4. The drain port 21 communicates with the drain passage 2 through a spill chamber 22 formed above the valve chamber 51. The high-pressure port 32 extends vertically through the orifice plates P1 and P2 and communicates with the high-pressure passage 3 through a groove 33 formed in a lower end surface of the orifice plate P2.

Specifically, when the ball valve 52 opens the drain port 21 and closes the high-pressure port 32, it will cause the fuel in the control chamber 4 to flow out of the drain port 21 through the valve chamber 51, so that the pressure within the control chamber 4 drops. When the pressure within the control chamber 4 decreases below a given nozzle needle-opening level, it will cause the nozzle needle 12 is moved out of the nozzle seat 13, thereby initiating the fuel injection. Alternatively, when the ball valve 52 closes the drain port 21 and opens the high-pressure port 32, it will cause the control chamber 4 to be increased in pressure by the fuel flowing from the high-pressure port 32, thereby moving the nozzle needle 12 downward into engagement with the nozzle seat 13.

The control chamber 4 communicates directly with the high-pressure passage 3 at all times through a sub-orifice 43 formed in the orifice plate P1. The sub-orifice 43 serves to supply the fuel from the high-pressure passage 3 to the control chamber 4 to reduce a pressure drop in the control chamber 4 at the start of fuel injection for smoothing the movement of the nozzle needle 12, while it works to promote a pressure rise in the control chamber 4 to speed up the movement of the nozzle needle 12 when closing the spray hole 11.

Around an opening of the drain part 21 leading to the valve chamber 51, a conical drain seat 53 is formed. Around the high-pressure port 32 leading to the valve chamber 51, a flat high-pressure seat 54 is formed. The drain seat 53 may alternatively be formed to be flat, while the high-pressure seat 54 may be formed to be conical. This compensates for a lateral shift of the ball valve 52. The pressure in the valve chamber 51 is always higher than the pressure in the drain port 21, so that the ball valve 52 is kept seated on the drain seat 53. The pressure acting on the ball valve 52 to urge it into engagement with the high-pressure seat 54 is provided by a small-diameter piston 18 of the hydraulic control valve 1.

The hydraulic control valve 1 is equipped with a piezoelectric actuator 14 as a power source. The mechanical deformation or displacement of the piezoelectric actuator 14 is transmitted to an actuator piston 15 installed on a lower end of the piezoelectric actuator 14 and then to the small-diameter piston 18 through a large-diameter piston 17 and a displacement amplifying chamber 6. The piezoelectric actuator 14 is made of a laminate of lead zirconium titanate (PZT) layers (also called a piezo stack) which works to expand when electrically charged and contract when discharged. The structure of the piezoelectric device is well known in the art, and explanation thereof in detail will be omitted here. The actuator piston 15 is disposed slidably within an actuator cylinder H1 an connects with the large-diameter piston 17 through a rod 16. The large-diameter piston 17 and the small-diameter piston 18 are disposed slidably within a large-diameter cylindrical chamber B3 and a small-diameter cylindrical chamber H4 formed coaxially within a hollow cylinder H2. The rod 16 extends from an upper end surface of the large-diameter piston 17 upwards and is fitted within a lower end surface of the actuator piston 15.

Defined below the lower end of the actuator piston 15 around the rod 16 is an oil sump 7 leading to the drain passage 2. A coil spring 71 is disposed within the oil sump 7 to urge the actuator piston 15 upward together with the large-diameter piston 17. Specifically, the actuator piston 15 and the large-diameter piston 17 are urged upward by the spring 71, so that they may move following the expansion or contraction of the piezoelectric actuator 14. An O-ring 73 is installed in an annular groove formed in a side wall of the actuator piston 15 for protecting the piezoelectric actuator 14 from contamination of working fluid (i.e., the fuel) within the oil sump 7. The oils sump 7 communicates with the drain passage 2 through a passage 95. The passage 95 is formed by drilling side walls of the housing H and the actuator cylinder H1 and closing a hole formed the housing H using a plug 74.

The hollow cylinder H2 has formed on an inner wall between the small-diameter cylinder chamber H4 and the large-diameter cylinder chamber H3 an inner shoulder working as a stopper 61 which defines an upper limit of the small-diameter piston 18. The small-diameter cylinder chamber H4 and the large-diameter cylinder chamber H3 communicate with each other through a central hole formed in the stopper 61. The small-diameter cylinder chamber H4 defines a hydraulic chamber A between the upper end thereof and the stopper 61. The large-diameter cylinder chamber H3 defines a hydraulic chamber B between the lower end thereof and the stopper 61. The hydraulic chambers A and B define the displacement amplifying chamber 6. The displacement amplifying chamber 6 works to transmit the longitudinal displacement of the large-diameter piston 17 to the small-diameter piston 18. Specifically, the stroke of the large-diameter piston 17 (i.e., the vertical movement of the piezoelectric actuator 14) is amplified through the fuel within the displacement amplifying chamber 6 as a function of a difference in diameter between the large-diameter piston 17 and the small-diameter piston 18 (e.g., two or three times the displacement of the large-diameter piston 17) and transmitted to the small-diameter piston 18. A lower portion of the small-diameter piston 18 lies within the spill chamber 22. The small-diameter piston 18 has a thin head which extends into the drain port 21 and contacts with the ball valve 52.

Within the large-diameter piston 18, a vertical passage 72 extends and communicates at an upper end thereof with a lateral passage opening into the oil sump 7. The vertical passage 72 extends at a lower end thereof to the lower end of the large-diameter piston 17 and communicates with the displacement amplifying chamber 6 through a check valve 8 installed on the lower end of the large-diameter piston 17. The check valve 8 works to compensate for a loss of fuel caused by leakage from the oil sump 7 to the displacement amplifying chamber 6 and consists of a flat valve 81 closing the lower opening of the passage 72 and a conical spring 82 urging the flat valve 81 upwards. The flat valve 81 and the conical spring 82 are disposed within a holder 83 made of a cup-shaped cylinder. The holder 83 is fitted on a lower end portion of the large-diameter piston 18. The holder 83 has formed in the bottom thereof a hole 85 which is much greater than the pinhole 84 and establishes communication between an inner chamber of the holder 83 and the displacement amplifying chamber 6 for facilitating the flow of fuel into the displacement amplifying chamber 6.

The flat valve 81 is made of a thin disc which has a thickness of 0.1 to 0.2 mm and parallel sides 86. A pinhole 84 is formed in the center of the flat valve 81 which has a diameter of 0.02 to 0.5 mm. The pinhole 84 serves to allows the leakage of the fuel within the displacement amplifying chamber 6 to the oil sump 7 in the event of any failure of a fuel injection system during the fuel injection, thereby stopping the fuel injection. The pinhole 84 also works to facilitate drawing a vacuum in the displacement amplifying chamber 6 for injecting the fuel thereinto without any bubbles after assemble of the fuel injector 100.

In operation of the fuel injector 100, when it is required to initiate the fuel injection, a voltage of about 100 to 150V required to open the drain port 21 is applied to the piezoelectric actuator 14. The piezoelectric actuator 14 expands, for example, 40 gm proportional to the applied voltage to move the large-diameter piston 17 downward, thereby elevating the pressure in the displacement amplifying chamber 6. The elevation in pressure in the displacement amplifying chamber 6 causes the small-diameter piston 18 to move downward to push the ball valve 52 out of engagement with the drain seat 53. The ball valve 52 then rests on the high-pressure seat 54. The degree of movement of the ball valve 52 is a multiple (will also be referred to as an amplification factor below) of the degree of expansion of the piezoelectric actuator 14 which corresponds to a sectional area ratio of the large-diameter piston 17 to the small-diameter piston 18. A optimum range of the amplification factor will be described later in detail.

When the ball valve 52 moves out of engagement with the drain seat 53, it establishes communication between the valve chamber 51 and the drain port 21, while it blocks communication between the high-pressure port 32 and the valve chamber 51, so that the pressure in the valve chamber 51 drops, thereby decreasing the pressure in the control chamber 4. When the pressure in the fuel sump 31 exceeds the sum of the pressure in the control chamber 4 and the pressure produced by the coil spring 41, it will cause the nozzle needle 12 to be lifted upwards to open the spray hole 11, thereby initiating the fuel injection.

When it is required to terminate the fuel injection, the piezoelectric actuator 14 is discharged electrically. This will cause the piezoelectric actuator 14 to contract to an original length thereof, thereby causing the actuator piston 15 to be lifted up by the spring 71. The large-diameter piston 17 is also lifted up, thus resulting in a decrease in pressure of the displacement amplifying chamber 6. The drop in pressure in the displacement amplifying chamber 6 causes the small-diameter piston 18 to be moved upward together with the ball valve 52.

When the ball valve 52 rests on the drain seat 53 again, it establishes the communication between the valve chamber 51 and the high-pressure port 32, while blocking the communication between the valve chamber 51 and the drain port 21, so that the pressure in the valve chamber 51 and the control chamber 4 is returned to the original level. When the pressure in the control chamber 4 rises, and the pressure urging the nozzle needle 12 downward exceeds the pressure in the fuel sump 31, it will cause the nozzle needle 12 to move downward so that it rests on the nozzle seat 13 again to close the spray hole 11, thereby terminating the fuel injection.

The amplification factor (i.e., a pressure-energized area ratio of the large-diameter piston 17 to the small-diameter piston 18) in the displacement amplifying chamber 6 is so selected that a power or output force F required for the piezoelectric actuator 14 to move the ball valve 52 for opening the drain port 21 is less than one-half of a maximum possible output force of the piezoelectric actuator 14 when applied with a maximum working voltage. The amplification factor is preferably determined so that the output force F when produced to open the drain port 21 is greater than or equal to one-fourth of the maximum possible output force of the piezoelectric actuator 14 under application of the maximum working voltage and less than one-half thereof. The maximum working voltage is an upper limit of an allowable voltage which can be safely applied to the piezoelectric actuator 14 without risking the possibility of breakdown of the piezoelectric actuator 14 and an electric circuit or actuator driver. The output force F required to open the drain port 21 is expressed by an equation below.

$$F = S_L \cdot P \cdot (S/s)$$

where $S_L$ is a seat area (mm²) of the drain seat 53 (i.e., an area of a plane defined by an annular line that is a line of contact between the ball valve 52 and the drain seat 53), P is the pressure in the high-pressure passage 3 (=a common rail pressure Kg/mm²), S is a pressure-energized area (i.e., a sectional area mm²) of the large-diameter piston 17, s is a pressure-energized area (i.e., a sectional area mm²) of the small-diameter piston 18, and S/s denotes the amplification factor.

Specifically, the output force F produced when opening the drain port 21 is proportional to the amplification factor (S/s) and thus may be set within the above range by adjusting the amplification factor to a particular value where SL and P are constants. This establishes effective transformation of electric energy applied to the piezoelectric actuator 14 within an allowable voltage range not causing damage to the piezoelectric actuator 14 and the actuator driver into a lift of the ball valve 52. This will be described in more detail below.

Figure 2A:
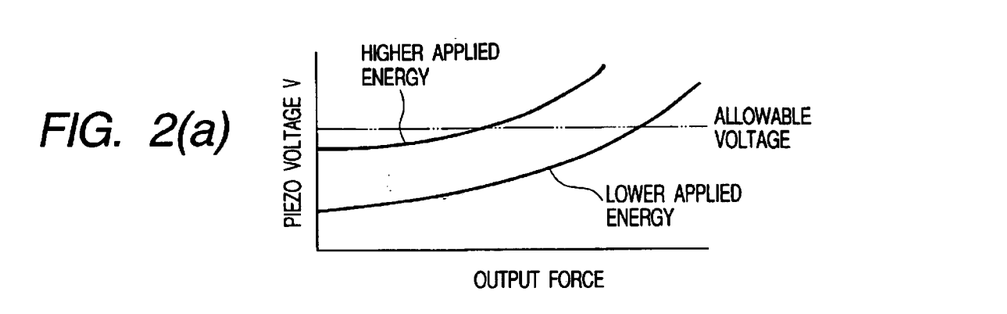
FIG. 2(a) shows relations between a voltage developed across terminals of a piezo stack of a piezoelectric actuator and an output force produced by the piezoelectric actuator when higher and lower constant electric energy are applied to the piezoelectric actuator.

The application of electric energy to the piezoelectric actuator 14 will result in a mechanical distortion or deformation of the piezoelectric actuator 14 which moves the large-diameter piston 17 to elevate the pressure in the pressure amplifying chamber 6. When the pressure in the pressure amplifying chamber 6 meets a relation of $p \cdot s = S_L \cdot P$ where p is the pressure in the pressure amplifying chamber 6, it initiates a lift (i.e., a downward movement as viewed in FIG. 1) of the ball valve 52. When the electric energy applied to the piezoelectric actuator 14 is constant, as shown in FIG. 2(a), a terminal voltage (i.e., piezo voltage V) appearing across terminals of the piezo stack of the piezoelectric actuator 14 increases greatly with an increase in output force. This is because electric charges proportional to the output force of the piezoelectric actuator 14 are produced in the piezo stack of the piezoelectric actuator 14 by a reactive pressure acting thereon and to which electric charges applied from the actuator driver are added.

Figure 2B:
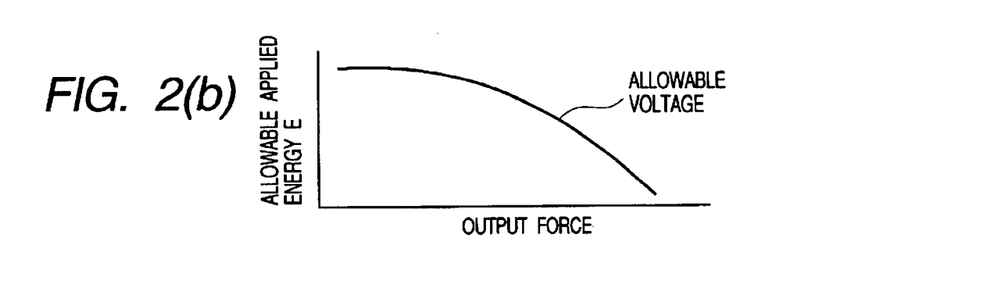
FIG. 2(b) shows a relation between an electric energy allowed to be applied to a piezoelectric actuator and an output force produced thereby when a constant allowable maximum voltage is applied to the piezoelectric actuator.

Therefore, in a case where the electric energy E applied to the piezoelectric actuator 14 is controlled so that the piezo voltage V developed when the hydraulic control valve 1 is opened, that is, when a hydraulic load acting on the ball valve 51 in a direction to close the drain port 21 is maximized may be equal to the maximum allowable voltage, a decrease in output force of the piezoelectric actuator 14 will result in a decrease in piezo voltage V if the applied electric energy E is kept constant. Specifically, when the ball valve 52 is lifted away from the drain seat 53 so that the hydraulic pressure within the valve chamber 51 drops, it will cause the hydraulic pressure acting on the piezoelectric actuator 14 to decrease, thus resulting in a decrease in output force required for the piezoelectric actuator 14 to keep the lift of the ball valve 52, which will cause the piezo voltage V to drop. Conversely, in a case where the maximum allowable voltage is predetermined, increasing the output force of the piezoelectric actuator 14 produced when opening the drain port 21 will cause the electric energy E allowed to be applied to the piezoelectric actuator 14 to decrease. This is illustrated in FIG. 2(b).

Figure 2C:
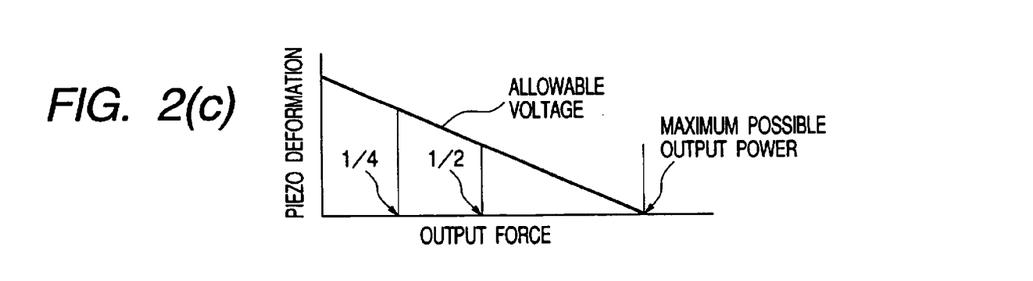
FIG. 2(c) shows a relation between an output force and the degree of mechanical distortion or displacement of a piezo stack of a piezoelectric actuator when a maximum allowable voltage applied to the piezoelectric actuator is constant.

FIG. 2(c) illustrates a relation between the output force and the degree of mechanical distortion or displacement δ (referred to as a piezo displacement below) of the piezo stack of the piezoelectric actuator 14 when the voltage (i.e., the maximum allowable voltage) applied to the piezoelectric actuator 14 is constant. The graph shows that when the output force decreases, the piezo displacement δ increases, which would result in a proportional increase in lift of the ball valve 52. In the relation of FIG. 2(c), the fact that the piezo voltage V drops after the ball valve 52 is lifted away from the drain seat 53, causing the pressure in the valve chamber 51 acting on the piezoelectric actuator 14 to drop is not considered. Therefore, when the amplification factor (S/s) is so selected as to increase the output force of the piezoelectric actuator 14 for compensating for the drop in piezo voltage V when lifting up the ball valve 52 or opening the drain port 21, it will cause the allowable applied energy to be decreased, so that the piezo voltage V is decreased by a drop in output force of the piezoelectric actuator 14 after the ball valve 52 is lifted. For instance, in a case of the lower applied energy as shown in FIG. 2(a), when the output force F produced when opening the drain port 53 is high, that is, when the amplification factor (S/s) is high, it will cause the energy actually applied to the piezoelectric actuator 14 to be low. It is, thus, possible to lift up the ball valve 52 to open the drain port 53, but however, the amount of the lift after the drain port 53 is opened becomes small, which will result in the possibility that the ball valve 52 does not rest on the high-pressure port 32.

Figure 2D:
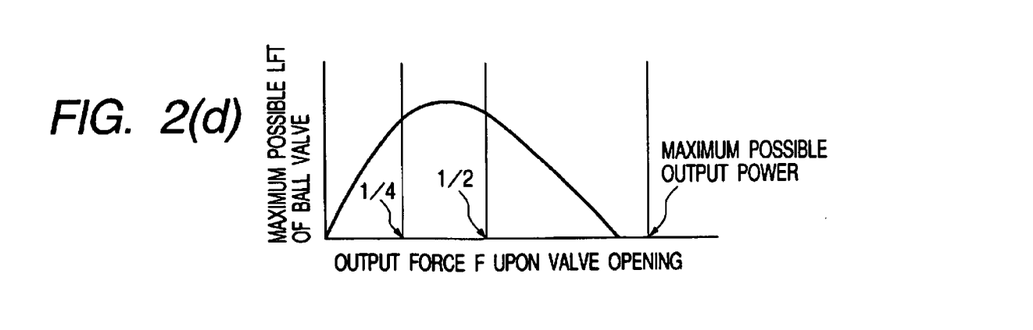
FIG. 2(d) shows a relation between a maximum possible amount of lift of a ball valve to open a drain port and an output force produced by a piezoelectric actuator when opening the drain port.

Conversely, decreasing the amplification factor (S/s) in order to decrease the output force F produced when opening the drain port 21 will cause a displacement of the small-diameter piston 18 to decrease as compared with a displacement of the piezoelectric actuator 14 (i.e., the large-diameter piston 17), which also result in difficulty in increasing the amount of lift of the ball valve 52. The amount L of lit of the ball valve 52 is expressed by a relation of $L = \delta \cdot (S/s) = \delta \cdot F/(S_L \cdot P)$ where $\delta$ is the displacement of the piezo stack of the piezoelectric actuator 14. Thus, a maximum possible amount of lift of the ball valve 52 changes, as shown in FIG. 2(d), with a change in output force F produced when moving the ball valve 52 to open the drain port 21. The curve in FIG. 2(d) has the peak when the output force F produced when moving the ball valve 52 to open the drain port 21 lies near three-eighths (3/8) of the maximum possible output force (i.e., an output force produced under application of the maximum allowable voltage when the displacement of the piezoelectric actuator 14 is restricted to zero) and shows that the output force F is preferably greater than or equal to one-fourth of the maximum possible output force and lower than one-half thereof in order to increase the maximum possible lift of the ball valve 52.

For example, in a case where the displacement $\delta$ of the piezoelectric actuator 14 when the output force thereof is 0 kg is 0.44 mm, and when the output force when the displacement $\delta$ is restricted to zero (0) is 200 kg, the maximum possible output force is 200 kg. It is, thus, advisable that the output force F of the piezoelectric actuator 14 required to move the ball valve 52 to open the drain port 21 lie within a range of 50 kg (i.e., one-fourth of 200 kg) to 100 kg (i.e., one-half of 200 kg). If the seat area $S_L$ of the drain seat 53 is 2.14 mm, and the pressure P of the high-pressure passage 3 (i.e., the pressure in the common rail) is 20 $kg/mm^2$, the relation between the optimum range of the output force F and the amplification factor (S/s) may be expressed below from the relation of $F = S_L \cdot P \cdot (S/s)$.

50 $kg \leq 42.8(S/s)kg < 100$ kg

We can rewrite the above as $50/42.8 \leq (S/s) < 100/42.8$.

Thus, the optimum range of the amplification factor (S/s) is $1.17 \leq (S/s) < 2.3$.

If the amplification factor (S/s) is 1.8 that is the central value of the above range, the output force F produced when moving the ball valve 52 to open the drain port 21 is 75 kg. From the curve in FIG. 2(b), the electric energy allowed to be applied to the piezoelectric actuator 14 at 150V is 2.7 times that required to open the drain port 21, thereby achieving effective transformation of the applied electric energy into a lift of the ball valve 52, as shown in FIG. 2(d). If the fuel injector 100 is so designed that the ball valve 52 rests on the high-pressure seat 54 before a lift of the ball valve 52 reaches a maximum possible lift provided by the piezoelectric actuator 14, an excessive energy is consumed in securing a firm seal between the ball valve 52 and the high-pressure seat 54.

The second embodiment of the fuel injector 100 will be described below which is designed to secure a firm seal between the ball valve 52 and the high-pressure seat 54.

The fuel injector 100 of this embodiment is so designed that the electric energy E required for the piezoelectric actuator 14 to move the ball valve 52 to open the drain port 21 is greater than or equal to the electric energy E' required for the piezoelectric actuator 14 to bring the ball valve 52 into contact with the high-pressure seat 54 to close the high-pressure port 32, thereby ensuring blocking of fluid communication between the valve chamber 51 and the high-pressure port 32 when the drain port 21 is opened to initiate the fuel injection.

Figure 3:
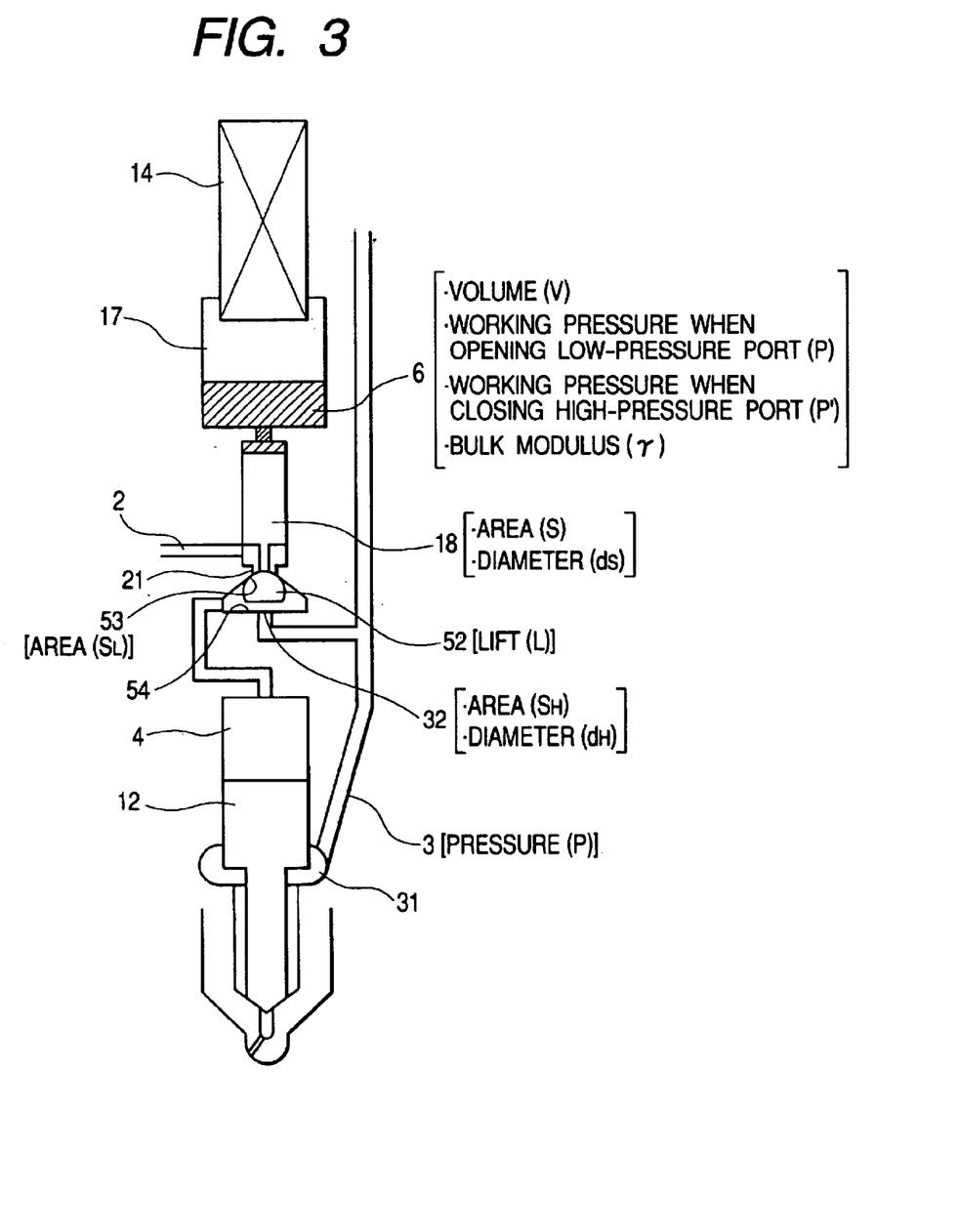
FIG. 3 is a schematic illustration which shows a fuel injector according to the second embodiment of the invention.

FIG. 3 is a schematic diagram which shows the fuel injector 100 of the second embodiment. In the diagram, $S_L$ is a seat area ($mm^2$) of the drain seat 53, i.e., an area of a plane, as discussed above, defined by an annular line that is a line of contact between the ball valve 52 and the drain seat 53, $S_H$ is a seat area ($mm^2$) of the high-pressure seat 54, $d_H$ is the diameter (mm) of the high-pressure seat 54, V is the volume ($mm^3$) of the displacement amplifying chamber 6, p is the working pressure ($kg/mm^2$) in the displacement amplifying chamber 6 when opening the drain port 21, p' is the working pressure ($kg/mm^2$) in the displacement amplifying chamber 6 when closing the high-pressure port 32, $\gamma$ is the bulk modulus ($Kg/mm^2$) of the working fluid (i.e., the fuel) in the displacement amplifying chamber 6, s is the pressure-energized area ($mm^2$) of the small-diameter piston 18, $d_s$ is the diameter (mm) of the small-diameter piston 18, S is the pressure-energized area ($mm^2$) of the large-diameter piston 17, L is a lift or distance (mm) the ball valve 52 travels from the drain seat 53 to the high-pressure seat 54, P is the pressure ($kg/mm^2$) in the high-pressure passage 3 (=the pressure in the common rail), and $\delta$ is the amount of mechanical distortion or displacement of the piezoelectric actuator 14. The force $F_P$ required to move the ball valve 52 to open the drain port 21 is expressed by $$F_P = S_L \cdot P = s \cdot p = s \cdot \gamma \cdot (S \cdot \delta / V) \tag{1}$$

The energy E required for the piezoelectric actuator 14 when opening the drain port 21 is $E = \frac{1}{2} \cdot \delta \cdot S \cdot p$ $= \frac{1}{2} \cdot (V \cdot S_L \cdot P/s \cdot \delta \cdot S) \cdot S \cdot (S_L \cdot P/s)$ $$= \frac{1}{2} \cdot (S_L \cdot P/s)^2 \cdot V/\gamma \tag{2}$$

The force $F_P'$ required to close the high-pressure port 32 is given by $$F_P' = S_H \cdot P = s \cdot p' = s \cdot \gamma \cdot (S \cdot \delta' / V) \tag{3}$$

The energy E' required for the piezoelectric actuator 14 to close the high-pressure port 32 is $E' = p' \cdot s \cdot L + \frac{1}{2} \cdot \delta' \cdot S \cdot p'$ $$=S_H \cdot P \cdot L + \frac{1}{2} \cdot (S_H \cdot P/s)^2 \cdot V/\gamma \quad (4)$$

where $S_H \cdot P \cdot L$ denotes a work of the ball valve 52, and $\frac{1}{2} \cdot (S_H \cdot P/s)^2 \cdot V/\gamma$ denotes a work of a pressure rise. From Eqs. (1) to (4), a relation among $S_L$, $S_H$, V, s, and L required to meet $E' \leq E$ may be expressed as $$S_H \cdot P \cdot L + \frac{1}{2} \cdot (S_H \cdot P/s)^2 \cdot V/\gamma \leq \frac{1}{2} \cdot (S_L \cdot P/s)^2 \cdot V/\gamma \quad (5)$$

It is, thus, found that by determining values of $S_L$, $S_H$, V, s, and L to satisfy Eq. (5), the energy E required to open the drain port 21 becomes greater than the energy E' required to close the high-pressure port 32, thereby ensuring complete closing of the high-pressure port 32.

If the seat area $d_H$ of the high-pressure seat 54=0.5 mm, the common rail pressure P=2000 Kg/mm$^2$=20 Kg/mm$^2$, the lift L of the ball valve 52=0.03 mm, the diameter $d_s$ of the small-diameter piston 18=5 mm, the volume V of the displacement amplifying chamber 6=5 mm$^3$, and the bulk modulus $\gamma$=100 kg/mm$^2$, the seat area SL of the high-pressure seat 54 and the pressure-energized area s of the small-diameter piston 18 are given by $$S_L = \pi/4 d_H^2 = \pi \times (0.5)^2/4 = 0.196 \ (mm^2)$$

$$s = \pi/4 \cdot d_s^2 = \pi \times 5^2/4 = 19.6 \ (mm^2)$$

By substituting these values into Eq. (5), we obtain $$0.196 \times 20 \times 0.03 + \frac{1}{2} \times (0.196 \times 20/19.6)^2 \times 100/5$$

$$\leq \frac{1}{2} \times (S_L \times 20/19.6)^2 \times 100/5$$

Thus, $S_L$ and s are $$0.118 \times 0.001 \leq 0.026 \times S_L^2$$

$$S_L \geq \sqrt{(0.119/0.026)} = 2.14 \ (mm^2)$$

$$d_L \geq \sqrt{(4 \times 2.14/\pi)} = 1.65 \ (mm^2)$$

Accordingly, Eq. (5) is satisfied by setting the diameter $d_L$ of the drain seat 53 to 1.65 (mm$^2$) or more. By applying the voltage to the piezoelectric actuator 14 so that the electric energy is given thereto which is greater than or equal to the energy E required to open the drain port 21, the high-pressure port 32 is closed by the ball valve 52 completely whenever the drain port 21 is opened, thereby establishing a firm seat between the high-pressure port 32 and the ball valve 52, which improves the accuracy of controlling the quantity of fuel to be injected to the engine.

The piezoelectric actuator 14 of this embodiment is made of a piezoelectric material, but may be replaced with another type of actuator equipped with a deformable element made of a material whose property produces a mechanical distortion or deformation under application of an electric energy. For example, a magnetostrictive device which shrinks or expands when placed in a magnetic field may be used. While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims. For example, the three-way valve 5 is used to open and close the spray hole 11 formed in the head of the nozzle body B1, however, the invention is not limited to the same. Another known mechanism such as a two-way valve may be used to open and close the spray hole 11.

What is clamed is:

1. A hydraulic control valve comprising:
   a piezoelectric actuator including a deformable element made of a material which produces a mechanical deformation under application of a voltage, said piezoelectric actuator being so designed that an increase in output force of said piezoelectric actuator results in a decrease in allowable applied energy to said piezoelectric actuator, which is caused by production of charges in said piezoelectric actuator as a function of the increase in output force of said piezoelectric actuator; and
   a hydraulic valve mechanism working to convert the deformation of said piezoelectric actuator into a hydraulic pressure to move a valve member hydraulically for opening and closing a fluid port selectively, said hydraulic valve mechanism being so designed that said piezoelectric actuator produces a maximum output force working to develop the hydraulic pressure when opening the fluid port through the valve member, the maximum output force decreasing after the fluid port is opened, said hydraulic valve mechanism including a first and a second piston, the first piston working to convert the deformation of said piezoelectric actuator into the hydraulic pressure which acts on the second piston to move the valve member, a diameter ratio of the first piston to the second piston being so determined that the maximum output force of said piezoelectric actuator when opening the fluid port is set smaller than one-half of the maximum possible output force of said piezoelectric actuator under application of a maximum working voltage to said piezoelectric actuator.

2. A hydraulic control valve as set forth in claim 1, wherein said hydraulic valve mechanism includes a large-diameter piston and a small-diameter piston, the large-diameter piston working to convert the deformation of said piezoelectric actuator into the hydraulic pressure, the hydraulic pressure acting on the small-diameter piston to move the valve member for opening the fluid port, the hydraulic pressure being amplified as a function of a diameter ratio of the large-diameter piston to the small-diameter piston, and wherein the diameter ratio is so determined that the maximum output force of said piezoelectric actuator when opening the fluid port is set smaller than one-half of the maximum possible output force thereof.

3. A hydraulic control valve as set forth in claim 1, wherein the maximum output force acting on the hydraulic pressure when opening the fluid port through the valve member is set greater than or equal to one-fourth of the maximum possible output force of said piezoelectric actuator.

4. A fuel injector comprising:
   a fuel spray mechanism working to spray fuel; and
   a hydraulic control valve including a piezoelectric actuator and a hydraulic valve mechanism working to actuate said fuel spray mechanism, said piezoelectric actuator including a deformable element made of a material which produces a mechanical deformation under application of a voltage, said piezoelectric actuator being so designed that an increase in output force of said piezoelectric actuator results in a decrease in allowable applied energy to said piezoelectric actuator, which is caused by production of charges in said piezoelectric actuator as a function of the increase in output force of said piezoelectric actuator:
   said hydraulic valve mechanism working to convert the deformation of said piezoelectric actuator into a hydraulic pressure to move a valve member hydraulically for opening and closing a fluid port selectively, thereby controlling a second hydraulic pressure serving to actuate said fuel spray mechanism, said hydraulic valve mechanism being so designed that said piezoelectric actuator produces a maximum output force working to develop the hydraulic pressure when opening the fluid port through the valve member, the maximum output force decreasing after the fluid port is opened, said hydraulic valve mechanism including a first and a second piston, the first piston working to convert the deformation of said piezoelectric actuator into the hydraulic pressure which acts on the second piston to move the valve member, a diameter ratio of the first piston to the second piston being so determined that the maximum output force of said piezoelectric actuator when opening the fluid port is set smaller than one-half of the maximum possible output force of said piezoelectric actuator under application of a maximum working voltage to said piezoelectric actuator.

5. A fuel injector as set forth in claim 4, wherein said fuel spray mechanism includes a hydraulic control chamber in which a hydraulic pressure is developed and controlled by opening and closing the fluid port selectively through the valve member of said hydraulic valve mechanism to establish and block fluid communication between the hydraulic control chamber and a low-pressure passage, respectively, and wherein the hydraulic pressure in the hydraulic control chamber works to move a nozzle needle to open or close a spray hole for initiating or terminating fuel injection.

6. A fuel injector as set forth in claim as set forth in claim 5, wherein said hydraulic valve mechanism includes a hydraulic chamber in which the deformation of said piezoelectric actuator is converted into the hydraulic pressure and changed in level as a function of the deformation of said piezoelectric actuator, the hydraulic pressure in the hydraulic chamber of said hydraulic valve mechanism working to move the valve member to open the fluid port, thereby establishing the fluid communication between the hydraulic control chamber and the low-pressure passage to decrease the hydraulic pressure in the hydraulic control chamber for initiating the fuel injection.

7. A fuel injector as set forth in claim 4, wherein the maximum output force acting on the hydraulic pressure when opening the fluid port through the valve member is set greater than or equal to one-fourth of the maximum possible output force of said piezoelectric actuator.

8. A hydraulic control valve comprising:
an actuator working to be deformed mechanically under application of an electric energy: and a hydraulic valve mechanism working to convert deformation of said actuator into a hydraulic pressure and to change the hydraulic pressure as a function of the deformation of said actuator to move a valve member for closing either of a high-pressure port leading to a high-pressure passage and a low-pressure port leading to a low-pressure passage,
wherein
when the electric energy is applied to said actuator, said hydraulic valve mechanism working to open the low-pressure port through the valve member while closing the high-pressure port,
when the electric energy is released from said actuator, said hydraulic valve mechanism working to open the high-pressure port while closing the low-pressure port, said hydraulic valve mechanism being so designed that the electric energy to be applied to said actuator when opening the low-pressure port is greater than or equal to an electric energy required to close the high-pressure wherein said hydraulic valve mechanism includes a hydraulic chamber in which the deformation of said actuator is converted into the hydraulic pressure of a working fluid and changed in level as a function of the deformation of said actuator and a piston on which the hydraulic pressure acts to move the valve member so that the valve member rests on one of a low-pressure port seat formed around the low-pressure port and a high-pressure port seat formed around the high-pressure port, and wherein said hydraulic valve mechanism is so designed as to meet a relation below $$S_H \cdot P \cdot L + \tfrac{1}{2} \cdot (S_H \cdot P/s)^2 V/\gamma \leq \tfrac{1}{2} \cdot (S_L \cdot P/s)^2 \cdot V/\tau$$

where $S_L$ is an area (mm$^2$) of the low-pressure port seat, $S_H$, is an area (mm$^2$) of the high-pressure port seat, V is a volume (mm$^3$) of the hydraulic chamber, r is a bulk modulus (Kg/mm$^2$) of the working fluid in the hydraulic chamber, s is an area (mm$^2$) of the piston on which the hydraulic pressure acts, L is a distance (mm) the valve member travels from the low-pressure port to the high-pressure port, and P is a pressure (Kg/mm$^2$) in the high-pressure passage.

9. A hydraulic control valve as set forth in claim 8, wherein said actuator is implemented by one of a piezoelectric actuator and a magnetostrictive actuator.

10. A fuel injector comprising:
a fuel spray mechanism working to spray fuel; and
a hydraulic control valve including a piezoelectric actuator and a hydraulic valve mechanism working to actuate said fuel spray mechanism, said actuator working to be deformed mechanically under application of an electric energy, said hydraulic valve mechanism working to convert deformation of said actuator to move a valve member for closing either of a high-pressure port leading to a high-pressure passage and a low-pressure port leading to a low-pressure passage to control a second hydraulic pressure serving to actuate said fuel spray mechanism, when the electric energy is applied to said actuator, said hydraulic valve mechanism working to pen the low-pressure port through the valve member while closing the high-pressure port, when the electric energy is released from said actuator, said hydraulic valve mechanism working to pen the hydraulic valve mechanism being so designed that the electric port is greater than or equal to an electric energy required to close the high-pressure port.
a voltage, said piezoelectric actuator being so designed that an increase in output force of said piezoelectric actuator results in a decrease in electric energy suppliable to said piezoelectric actuator which is caused by production of chares in said piezoelectric actuator as a function of the increase in output force of said piezoelectric actuator;
said hydraulic valve mechanism working to convert the deformation of said piezoelectric actuator into a hydraulic pressure to move a valve member hydraulically for, opening and closing a fluid port selectively, thereby controlling a second hydraulic pressure serving to actuate said fuel spray mechanism, said hydraulic valve mechanism being so designed that said piezoelectric actuator produces a maximum output force working to develop the hydraulic pressure when opening the fluid port through the valve member, the maximum output force decreasing after the fluid port is opened, said hydraulic valve mechanism including a first and a second piston, the first piston working to convert the deformation of said piezoelectric actuator into the hydraulic pressure which acts on the second piston to move the valve member, a diameter ratio of the first piston to the second piston being so determined that the maximum output force of said piezoelectric actuator when opening the fluid port is set smaller than one half of the maximum possible output force of said piezoelectric actuator under application of a maximum working voltage to said piezoelectric actuator, wherein said hydraulic valve mechanism includes a hydraulic chamber in which the deformation of said actuator is converted into the hydraulic pressure of a working fluid and changed in level as a function of the deformation of said actuator and a piston on which the hydraulic pressure acts to move the valve member so that the valve member rests on one of a low-pressure port seat formed around the low-pressure port and a high-pressure port seat formed around the high-pressure port, and wherein said hydraulic valve mechanism is so designed as to meet a relation below $$S_H \cdot P \cdot L + \tfrac{1}{2} \cdot (S_H \cdot P/s)^2 \cdot V/\gamma \leq \tfrac{1}{2} \cdot (S_L \cdot P/s)^2 \cdot V/\gamma$$

where $S_L$ is an area (mm$^2$) of the low-pressure port seat. $S_H$ is an area (mm$^2$) of the high-pressure port seat V is a volume (mm$^3$) of the hydraulic chamber, $\gamma$ is a bulk modulus (Kg/mm$^2$) of the working fluid in the hydraulic chamber, s is an area (mm$^2$) of the piston on which the hydraulic pressure acts. L is a distance (mm) the valve member travels from the low-pressure port to the high-pressure port, and P is a pressure (Kg/mm$^2$) in the high-pressure passage.

11. A hydraulic control valve as set forth in claim 10, wherein said actuator is implemented by one of a piezoelectric actuator and a magnetostrictive actuator.

12. A hydraulic control valve as set forth in claim 1, wherein the first piston is opposed to the second piston through a hydraulic chamber, and wherein a ratio of a pressure-energized area of the first piston on which a hydraulic pressure within the hydraulic chamber acts to that of the second piston on which the hydraulic pressure within the hydraulic chamber acts is greater than or equal to 1.17 and smaller than 2.3.

13. A hydraulic control valve as set forth in claim 1, wherein when the electric energy is supplied to said piezoelectric actuator, the valve member is moved to close a high-pressure hydraulic port and open a low-pressure hydraulic port for opening the fluid port.

14. A hydraulic control valve as set forth in claim 13, further comprising a pressure control chamber communicating with the high-pressure hydraulic port and the low-pressure hydraulic port, and wherein when the electric energy is supplied to said piezoelectric actuator, said piezoelectric actuator works to move the valve member to close the high-pressure hydraulic port while opening the low-pressure hydraulic port to decrease a hydraulic pressure within the pressure control chamber, thereby opening the fluid port.

15. A hydraulic control valve as set forth in claim 4, wherein the first piston is opposed to the second piston through a hydraulic chamber, and wherein a ratio of a pressure-energized area of the first piston on which a hydraulic pressure within the hydraulic chamber acts to that of the second piston on which the hydraulic pressure within the hydraulic chamber acts is greater than or equal to 1.17 and smaller than 2.3.

16. A hydraulic control valve as set forth in claim 4, wherein when the electric energy is supplied to said piezoelectric actuator, the valve member is moved to close a high-pressure hydraulic port and open a low-pressure hydraulic port for opening the fluid port.

17. A hydraulic control valve as set forth in claim 16, further comprising a pressure control chamber communicating with the high-pressure hydraulic port and the low-pressure hydraulic port, and wherein when the electric energy is supplied to said piezoelectric actuator, said piezoelectric actuator works to move the valve member to close the high-pressure hydraulic port while opening the low-pressure hydraulic port to decrease a hydraulic pressure within the pressure control chamber, thereby opening the fluid port.

* * * * *